US011458891B1

(12) United States Patent
Kuehner et al.

(10) Patent No.: US 11,458,891 B1
(45) Date of Patent: Oct. 4, 2022

(54) SECONDARY HORN SYSTEM FOR A VEHICLE

(71) Applicant: Toyota Research Institute, Inc., Los Altos, CA (US)

(72) Inventors: Manuel Ludwig Kuehner, Mountain View, CA (US); Hiroshi Yasuda, San Francisco, CA (US); Jaime Camhi, San Jose, CA (US)

(73) Assignee: Toyota Research Institute, Inc., Los Altos, CA (US)

( * ) Notice: Subject to any disclaimer, the term of this patent is extended or adjusted under 35 U.S.C. 154(b) by 0 days.

(21) Appl. No.: 17/222,166

(22) Filed: Apr. 5, 2021

(51) Int. Cl.
*B60Q 1/50* (2006.01)
*B60Q 9/00* (2006.01)
*H04R 1/32* (2006.01)

(52) U.S. Cl.
CPC .............. *B60Q 9/008* (2013.01); *H04R 1/323* (2013.01)

(58) Field of Classification Search
CPC ................................ B60Q 9/008; H04R 1/323
USPC ........................................................ 340/464
See application file for complete search history.

(56) References Cited

U.S. PATENT DOCUMENTS

| 4,704,610 | A | * | 11/1987 | Smith | ..................... | G08G 1/087 |
| | | | | | | 340/906 |
| 5,281,949 | A | * | 1/1994 | Durley | ..................... | B60Q 1/50 |
| | | | | | | 340/901 |
| 9,526,477 | B2 | | 12/2016 | Naboulsi | | |
| 9,878,664 | B2 | | 1/2018 | Kentley-Klau et al. | | |
| 10,259,383 | B1 | * | 4/2019 | Campbell | .............. | H04N 5/247 |
| 10,308,246 | B1 | | 6/2019 | Konrardy et al. | | |
| 10,576,994 | B1 | * | 3/2020 | Higgins | ............. | G06K 9/00845 |
| 10,696,222 | B1 | * | 6/2020 | Pandit | .................... | G08G 1/202 |
| 10,882,538 | B1 | * | 1/2021 | Witt | ...................... | G01S 15/931 |
| 11,127,265 | B1 | * | 9/2021 | Kimchi | .................... | H04R 3/12 |
| 2002/0101360 | A1 | * | 8/2002 | Schrage | ................. | G08G 1/095 |
| | | | | | | 340/901 |
| 2003/0108212 | A1 | * | 6/2003 | Yun | ........................ | G01S 15/931 |
| | | | | | | 381/86 |
| 2004/0090318 | A1 | * | 5/2004 | Rothkop | ................ | B60Q 9/008 |
| | | | | | | 340/435 |

(Continued)

OTHER PUBLICATIONS

Lavers, "Robotic road rage? Google's self-driving car learns how to honk", available at https://newatlas.com/google-self-driving-car-honk/43664/ Jun. 3, 2016 (accessed Feb. 13, 2021).

(Continued)

*Primary Examiner* — Kerri L Mcnally
*Assistant Examiner* — Thang D Tran
(74) *Attorney, Agent, or Firm* — Christopher G. Darrow; Darrow Mustafa, PC (57) ABSTRACT

A secondary horn system for a vehicle includes a processor and a memory communicably coupled to the processor and storing a secondary horn system control module. The control module may include instructions that when executed by the processor cause the processor to determine a presence of an alert space along a projected path of the vehicle and, responsive to a determination of the presence of an alert space, control operation of a secondary horn system to transmit a sound into the alert space. The system may provide for autonomous operation of the secondary horn system in certain driving situations, thereby easing demands on the driver and enhancing driver safety.

15 Claims, 6 Drawing Sheets

(56) References Cited

U.S. PATENT DOCUMENTS

| | | | | |
|---|---|---|---|---|
| 2007/0257783 | A1* | 11/2007 | Matsumoto | B60Q 1/506 340/426.25 |
| 2009/0110224 | A1* | 4/2009 | Tobin | B60R 19/48 381/340 |
| 2009/0322559 | A1* | 12/2009 | Yen | G08G 1/0965 340/901 |
| 2011/0080276 | A1* | 4/2011 | Campmans | B60Q 5/00 340/425.5 |
| 2011/0128161 | A1* | 6/2011 | Bae | B60Q 5/006 340/901 |
| 2011/0175755 | A1* | 7/2011 | Yoshioka | G08G 1/166 340/995.1 |
| 2012/0299748 | A1* | 11/2012 | Reid | B60Q 5/003 340/902 |
| 2013/0093582 | A1* | 4/2013 | Walsh | G08G 1/166 340/436 |
| 2014/0172239 | A1* | 6/2014 | Vergara | B60Q 1/24 701/49 |
| 2015/0091740 | A1* | 4/2015 | Bai | B60Q 9/008 340/901 |
| 2016/0196823 | A1* | 7/2016 | Yellambalase | B60R 1/00 348/148 |
| 2016/0231135 | A1* | 8/2016 | Nishibashi | G10L 13/086 |
| 2016/0368364 | A1* | 12/2016 | Aoki | B60K 11/08 |
| 2017/0162054 | A1* | 6/2017 | Nespolo | B60Q 9/008 |
| 2018/0012496 | A1 | 1/2018 | Hasberg et al. | |
| 2018/0050635 | A1* | 2/2018 | Vincent | B60Q 9/008 |
| 2018/0132285 | A1* | 5/2018 | Jackson | G08G 1/0955 |
| 2018/0345993 | A1* | 12/2018 | Fujita | B60N 2/90 |
| 2019/0016331 | A1* | 1/2019 | Carlson | G05D 1/0088 |
| 2019/0071081 | A1* | 3/2019 | Katayama | B60Q 9/008 |
| 2019/0222924 | A1* | 7/2019 | Groleau | H04R 1/025 |
| 2019/0270376 | A1* | 9/2019 | Sedlak | G10K 9/22 |
| 2019/0279503 | A1* | 9/2019 | Patel | G08G 1/0133 |
| 2019/0310633 | A1* | 10/2019 | Toyoda | B60Q 1/04 |
| 2020/0284872 | A1* | 9/2020 | Fix | G01S 7/062 |
| 2021/0023987 | A1* | 1/2021 | Bader | B60Q 1/2611 |
| 2021/0245742 | A1* | 8/2021 | Ha | B60W 30/09 |
| 2021/0409379 | A1* | 12/2021 | Hwang | G06V 10/25 |

OTHER PUBLICATIONS

Anand, "Is this the city with the loudest car horns?", available at https://www.bbc.com/news/magazine-25944792, Feb. 1, 2014 (accessed Feb. 13, 2021).

* cited by examiner

SECONDARY HORN SYSTEM FOR A VEHICLE

The embodiments disclosed herein relate to horn systems for vehicles and, more particularly, to a secondary horn system which is programmable and autonomously operable independently of a conventional vehicle horn system.

BACKGROUND

A motor vehicle generally includes a manually operable horn system for use in alerting pedestrians and other vehicles to the presence of the motor vehicle. However, under certain potential driving conditions of the motor vehicle, manual operation of a conventional horn may become stressful and physically fatiguing. For example, long-term repeated manual operation of the horn in attempting to navigate the motor vehicle through a crowd of pedestrians may be frustrating and exhausting for the driver of the motor vehicle. Such conditions are prevalent in many countries such as China and India with high urban population densities, when a large number of people are constantly crossing a street at an intersection and the vehicle is trying to navigate through the crowds to proceed along its path. Also, there are driving situations and geographical locations in which timely activation of the horn may provide advance notice of the motor vehicle's presence and direction, thereby possible preventing an accident. However, the driver may not be aware of such situations or locations until the vehicle has already encountered them.

SUMMARY

In one aspect of the embodiments described herein, a secondary horn system for a vehicle is provided. The secondary horn system may include a processor and a memory communicably coupled to the processor and storing a secondary horn system control module. The control module may include instructions that when executed by the processor cause the processor to determine a presence of an alert space along a projected path of the vehicle and, responsive to a determination of the presence of an alert space, control operation of a secondary horn system to transmit a sound into the alert space.

In another aspect of the embodiments described herein, a method of controlling a secondary horn system of a vehicle is provided. The method may include steps of determining a presence of an alert space along a projected path of the vehicle and, responsive to the determination of the presence of an alert space, controlling operation of the secondary horn system to transmit a sound into the alert space.

In yet another aspect of the embodiments described herein, a non-transitory computer-readable medium is provided for controlling a secondary horn system of a vehicle. The computer-readable medium may store instructions that when executed by one or more processors cause the one or more processors to determine a presence of an alert space along a projected path of the vehicle and, responsive to a determination of the presence of an alert space, control operation of a vehicle secondary horn system to transmit a sound into the alert space.

BRIEF DESCRIPTION OF THE DRAWINGS

The accompanying drawings, which are incorporated in and constitute a part of the specification, illustrate various systems, methods, and other embodiments of the disclosure. It will be appreciated that the illustrated element boundaries (e.g., boxes, groups of boxes, or other shapes) in the figures represent one embodiment of the boundaries. In some embodiments, one element may be designed as multiple elements or multiple elements may be designed as one element. In some embodiments, an element shown as an internal component of another element may be implemented as an external component and vice versa. Furthermore, elements may not be drawn to scale.

DETAILED DESCRIPTION

Embodiments described herein relate to a secondary horn system for a vehicle. The secondary horn system may be user-programmable and autonomously operable independently of a conventional vehicle horn system. The horn system may be programmable to operate autonomously in certain pre-defined driving situations where manual operation of a conventional vehicle horn may be excessively stressful, physically demanding, and time-consuming for a human driver. The horn system may also be programmable to operate autonomously in certain pre-defined driving situations and/or geographical locations where an elevated risk of collision or accident may exist, but where the user may not be aware of the situations and/or locations in time for optimum operation of the horn.

Figure 1:
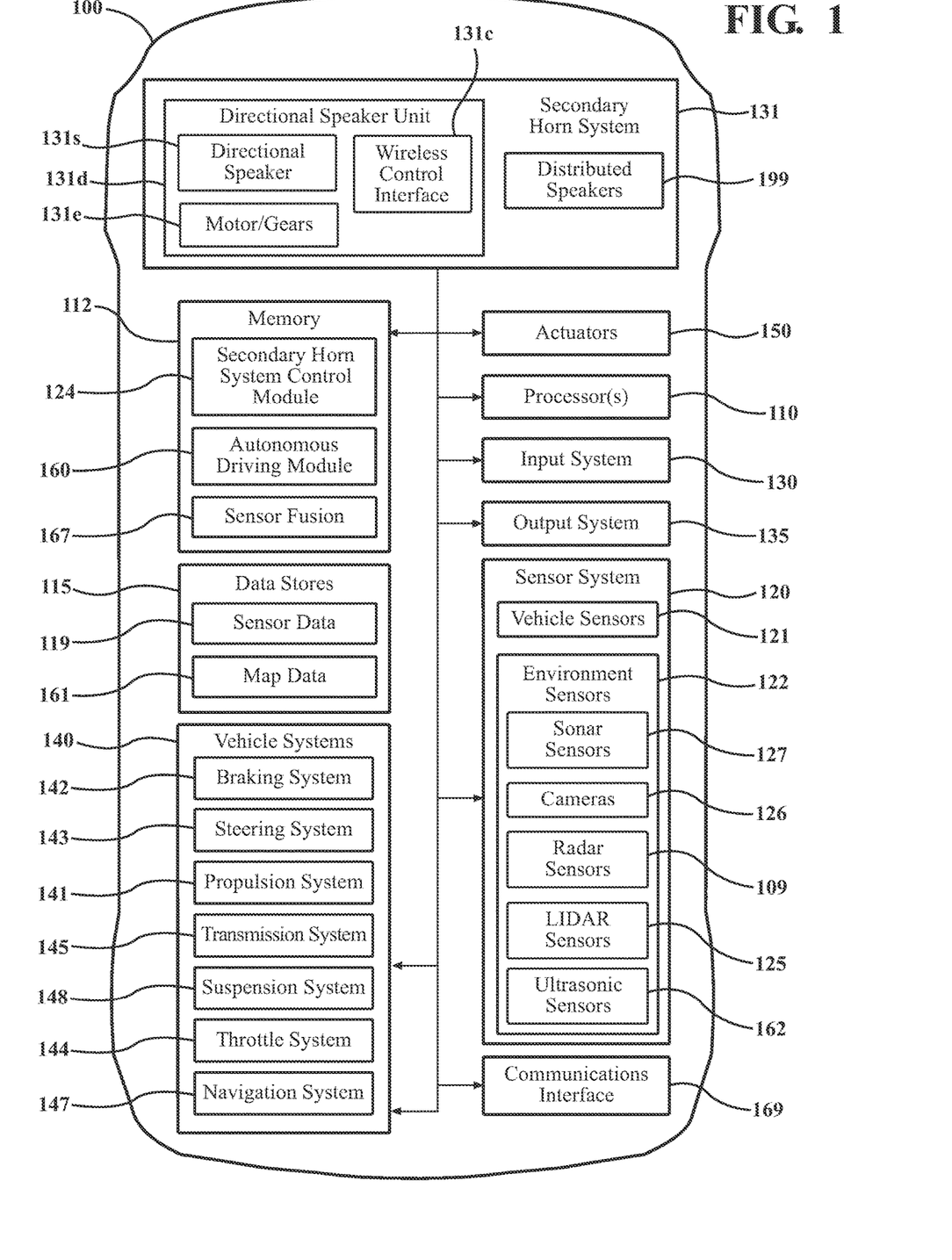
FIG. 1 is a block schematic diagram of a vehicle incorporating a secondary horn system in accordance with embodiments described herein.

Referring to FIG. 1, an example of a vehicle 100 is illustrated. As used herein, a "vehicle" is any form of motorized transport. In one or more implementations, the vehicle 100 is a passenger vehicle. While arrangements will be described herein with respect to passenger vehicles, it will be understood that embodiments are not limited to passenger vehicles. In some implementations, the vehicle 100 may be any form of motorized transport that benefits from the functionality discussed herein.

The vehicle 100 also includes various elements. It will be understood that in various embodiments it may not be necessary for the vehicle 100 to have all of the elements shown in FIG. 1. The vehicle 100 can have any combination of the various elements shown in FIG. 1. Further, the vehicle 100 can have additional elements to those shown in FIG. 1. In some arrangements, the vehicle 100 may be implemented without one or more of the elements shown in FIG. 1. While the various elements are shown as being located within the vehicle 100 in FIG. 1, it will be understood that one or more of these elements can be located external of the vehicle 100.

Some of the possible elements of the vehicle 100 are shown in FIG. 1 and will be described with reference thereto. Additionally, it will be appreciated that for simplicity and clarity of illustration, where appropriate, reference numerals may have been repeated among the different figures to indicate corresponding or analogous elements. In addition, the discussion outlines numerous specific details to provide a thorough understanding of the embodiments described herein. Those of skill in the art, however, will understand that the embodiments described herein may be practiced using various combinations of these elements.

FIG. 1 shows a block schematic diagram of a vehicle 100 incorporating a secondary horn system in accordance with embodiments described herein. In some instances, the vehicle 100 may be configured to switch selectively between an autonomous mode, one or more semi-autonomous operational modes, and/or a manual mode. Such switching can be implemented in a suitable manner, now known or later developed. "Manual mode" means that all of or a majority of the navigation and/or maneuvering of the vehicle is performed according to inputs received from a user (e.g., human driver). In one or more arrangements, the vehicle 100 can be a conventional vehicle that is configured to operate in only a manual mode.

In one or more embodiments, the vehicle 100 is an autonomous vehicle. As used herein, "autonomous vehicle" refers to a vehicle that can operate in an autonomous mode. "Autonomous mode" refers to navigating and/or maneuvering the vehicle 100 along a projected path of the vehicle using one or more computing systems to control the vehicle 100 with minimal or no input from a human driver. In one or more embodiments, the vehicle 100 is highly automated or completely automated. In one or more arrangements, the vehicle 100 is configured with one or more semi-autonomous operational modes in which one or more computing systems perform a portion of the navigation and/or maneuvering of the vehicle along a projected path, and a vehicle operator (i.e., driver) provides inputs to the vehicle to perform a portion of the navigation and/or maneuvering of the vehicle 100 along the projected path.

The vehicle 100 can include one or more processors 110. In one or more arrangements, the processor(s) 110 can be a main processor(s) of the vehicle 100. For instance, the processor(s) 110 can be an electronic control unit (ECU). The vehicle 100 can include one or more data stores 115 for storing one or more types of data. The data store(s) 115 can include volatile and/or non-volatile memory. Examples of suitable data store(s) 115 include RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The data store(s) 115 can be a component of the processor(s) 110, or the data store(s) 115 can be operably connected to the processor(s) 110 for use thereby. The term "operably connected," as used throughout this description, can include direct or indirect connections, including connections without direct physical contact.

The one or more data store(s) 115 can include sensor data 119. In this context, "sensor data" means any information about the sensors that the vehicle 100 is equipped with, including the capabilities and other information about such sensors. As will be explained below, the vehicle 100 can include the sensor system 120. The sensor data 119 can relate to one or more sensors of the sensor system 120. As an example, in one or more arrangements, the sensor data 119 can include information on one or more radar sensors 109 of the sensor system 120.

As noted above, the vehicle 100 can include the sensor system 120. The sensor system 120 can include one or more sensors. "Sensor" means any device, component and/or system that can detect, and/or sense something. The one or more sensors can be configured to detect, and/or sense in real-time. As used herein, the term "real-time" means a level of processing responsiveness that a user or system senses as sufficiently immediate for a particular process or determination to be made, or that enables the processor to keep up with some external process. In arrangements in which the sensor system 120 includes a plurality of sensors, the sensors can work independently from each other. Alternatively, two or more of the sensors can work in combination with each other. In such case, the two or more sensors can form a sensor network. The sensor system 120 and/or the one or more sensors can be operably connected to the processor(s) 110, the data store(s) 115, and/or other element(s) of the vehicle 100 (including any of the elements shown in FIG. 1).

The sensor system 120 can include any suitable type of sensor. Various examples of different types of sensors will be described herein. However, it will be understood that the embodiments are not limited to the particular sensors described. Various examples of sensors of the sensor system 120 are described herein. The example sensors may be part of the one or more environment sensors 122 and/or the one or more vehicle sensors 121. However, it will be understood that the embodiments are not limited to the particular sensors described. The sensor system 120 may include any sensors suitable for and/or required to perform any of the data acquisition and/or vehicle control operations contemplated herein.

Sensors of sensor system 120 may be communicably coupled to the various systems and components of the vehicle 100. The sensors may be operably connected to the vehicle wireless communications interface 169 for transmission of information to an edge device or to a cloud or other storage facility or for vehicle-to-vehicle (V2V) or vehicle-to-everything (V2X) communications. The sensors may also be operably connected to other vehicle systems and components, such as data stores 115 and processor(s) 110, for storage and processing of vehicle and environment sensor data.

The sensor system 120 can include one or more vehicle sensors 121. The vehicle sensor(s) 121 can detect, determine, and/or sense information about the vehicle 100 itself and/or any occupants inside the vehicle. The vehicle sensor(s) 121 may include sensors configured to detect conditions and/or events inside the vehicle interior or occupant compartment. In one or more arrangements, the vehicle sensor(s) 121 can be configured to detect, and/or sense position and orientation changes of the vehicle 100, such as, for example, based on inertial acceleration. In one or more arrangements, the vehicle sensor(s) 121 can include one or more accelerometers, one or more gyroscopes, an inertial measurement unit (IMU), a dead-reckoning system, a global navigation satellite system (GNSS), a global positioning system (GPS), a navigation system 147, and/or other suitable sensors. The vehicle sensor(s) 121 can be configured to detect, and/or sense one or more characteristics of the vehicle 100, such as the current geographical location of the vehicle and a speed and acceleration/deceleration of the vehicle 100. The vehicle sensor(s) 121 may include vehicle directional sensors (not shown) configured to determine a current heading of the vehicle or direction in which the vehicle is pointed. The vehicle sensor(s) 121 may include sensors configured to sense aspects of the vehicle mechanical and electrical components and/or systems, to aid in determining a mechanical condition of the vehicle and existing and/or potential problems with the vehicle.

The sensor system 120 can include one or more environment sensors 122 configured to acquire data of at least a portion of the external environment of the vehicle 100 (e.g., nearby objects). The environment sensors 122 may detect data or information about the external environment in which the vehicle is located or one or more portions thereof. For example, the one or more environment sensors 122 can be configured to detect, quantify and/or sense objects in at least a portion of the external environment of the vehicle 100 and/or information/data about such objects. Such objects may be stationary objects and/or dynamic objects. The one or more environment sensors 122 can be configured to detect, measure, quantify, classify and/or sense other things in the external environment of the vehicle 100, such as, for example, pedestrians, animals, buildings and other structures, lane markers, signs, traffic lights, traffic signs, lane lines, crosswalks, curbs proximate the vehicle 100, off-road objects, weather conditions, other vehicles (e.g., bicycles, motorcycles, motor vehicles), etc. As an example, in one or more arrangements, the environment sensors 122 can include one or more radar sensors 109, one or more LIDAR sensors 125, one or more cameras 126, one or more ultrasonic sensors 162, and/or sonar sensors 127. Environment sensors 122 may be configured to detect aspects of road geometry, road grade/slope, traffic conditions, movements and characteristics of other vehicles, and other external events and conditions.

Environment sensors 122 may be configured to detect activation and deactivation of turn signals, brake lights, and other signals mounted on other vehicles or along a road. Environment sensors 122 may be configured to detect the presence of traffic control elements such as traffic lights, signage, etc., and to interpret and process any indications or messages conveyed by such elements. The environment sensors 122 may be configured to detect any characteristics of the vehicle environment from which the presence of alert zones as described herein may be determined. The environment sensors 122 may be configured to determine the presence and number of objects (both animate and inanimate) along a projected path of the vehicle, and to detect or estimate a distance of each detected object from the vehicle. The environment sensors 122 may be configured to detect objects when objects ahead of the vehicle enter and leave either a projected path of the vehicle or an alert zone determined by processing of sensor data.

Referring again to FIG. 1, a sensor fusion algorithm 167 may be an algorithm (or a computing device storing an algorithm) configured to accept data from the sensor system 120 as an input. The data may include, for example, data representing information sensed at the sensors of the sensor system 120. The sensor fusion algorithm 167 may include or be configured to be executed using, for instance, a Kalman filter, Bayesian network, or other algorithm. The sensor fusion algorithm 167 may provide various assessments based on the data from sensor system 120. Depending upon the embodiment, the assessments may include evaluations of individual objects and/or features in the environment of vehicle 100, evaluations of particular situations, and/or evaluations of possible impacts based on the particular situation. Other assessments are possible.

The vehicle wireless communications interface 169 may be configured to enable and/or facilitate communication between the components and systems of the vehicle and entities (such as cloud facilities, cellular and other mobile communications devices, other vehicles, remote servers, edge devices, pedestrians, etc.) exterior of the vehicle. Wireless communications interface 169 may be configured to facilitate, establish, maintain, and end wireless V2V and V2X communications with any extra-vehicular entity, for example other connectably-configured vehicles and connected vehicles, pedestrians, servers and entities located in the cloud, edge devices, and other information sources and entities. Information such as sensor data, traffic information, road condition information, weather information, navigational and map information and other types of information may be transmitted and received via the communications interface 169. If required, wireless communications interface 169 may incorporate or be in communication with any network interfaces needed to communicate with any extra-vehicular entities and/or networks.

The vehicle 100 can include an input system 130. An "input system" includes any device, component, system, element or arrangement or groups thereof that enable information/data to be entered into a machine. For example, the input system 130 may include a keypad, a touch screen or other interactive display, a voice-recognition system and/or any other device or system which facilitates communications between a user and the vehicle. The input system 130 can receive an input from a vehicle occupant (e.g., a driver or a passenger) or a user located remotely from the vehicle 100. In certain arrangements, the input system may be configured to serve as an interface enabling and/or facilitating user control of the vehicle driving mode. In particular embodiments, the input system may be configured to enable user input of parameter values defining the width WP of the vehicle projected path and/or values of other parameters according to user preferences. The vehicle 100 can also include an output system 135. An "output system" includes any device, component, or arrangement or groups thereof that enable information/data to be presented to a vehicle occupant (e.g., a driver, a vehicle passenger, etc.) or a remote user.

The vehicle 100 can include one or more vehicle systems, collectively designated 140. Various examples of the one or more vehicle systems 140 are shown in FIG. 1. However, the vehicle 100 can include more, fewer, or different vehicle systems. It should be appreciated that although particular vehicle systems are separately defined, each or any of the systems or portions thereof may be otherwise combined or segregated via hardware and/or software within the vehicle 100. The vehicle systems 140 can include a propulsion system 141, a braking system 142, a steering system 143, throttle system 144, a suspension system 148, a transmission system 145, and/or a navigation system 147. Each of these systems can include one or more devices, components, and/or a combination thereof, now known or later developed. The vehicle systems 140 may be communicatively coupled to (and operable under the control of) vehicle modules such as the autonomous driving module 160 for autonomous operation of the vehicle.

The navigation system 147 can include one or more devices, applications, and/or combinations thereof, now known or later developed, configured to determine the geographic location of the vehicle 100 and/or to determine a projected path for the vehicle 100. The navigation system 147 can include one or more mapping applications to determine a projected path for the vehicle 100. The navigation system 147 can include a global positioning system, a local positioning system or a geolocation system. The navigation system 147 may be configured to track the path of a vehicle along a projected path. The navigation system 147 may be configured to operate in conjunction with the autonomous driving module to guide the vehicle along a projected path selected by a user.

The navigation system 147 may be configured to operate in cooperation with sensor system 120 and with any other vehicular or extra-vehicular system for purposes of determining, storing, and communicating to other vehicle systems and to vehicle user(s) the locations and boundaries of the various alert spaces described herein relative to a location of the vehicle. In particular embodiments, parameters describing the alert spaces may be expressed in terms of geographical coordinates, such as global positioning system (GPS) coordinates or other navigational map reference coordinates, polar coordinates or Cartesian coordinates specified with respect to a vehicle-based reference frame, or any other suitable coordinates.

The vehicle 100 may incorporate a secondary horn system 131. The secondary horn system 131 may be autonomously operable independently of the conventional, manually-actuated horn system normally installed in vehicles. The secondary horn system 131 may be user-programmable and autonomously controllable by a secondary horn system control module 124 as described herein, responsive to various user-selectable driving situations.

An "alert space" may be a volume of space along the projected path PP1 of the vehicle 100 and containing one or more objects, where the number of objects in the space exceeds a predetermined threshold. An "alert space" may also be a volume of space along the projected path PP1 of the vehicle 100 and in which at least a portion of at least one object resides within a predetermined threshold distance of the projected path of the vehicle. The objects in the volume of space may having determinable characteristics (such as the number of objects in the space, the distances between the objects in the space, and/or the positions of the objects with respect to the projected path of the vehicle) which may create a possible collision hazard for the vehicle when the vehicle reaches a position at or near the object(s) during movement along the projected path. In one or more arrangements, an alert space may be defined by an area located along a road or surface on which the vehicle is moving, and a volume of space extending above the area a predetermined distance (for example, 10 feet above the surface). Then, object(s) within the alert space may reside on the surface and within the area. The objects may be pedestrians, pets, people in or on other vehicles such as bicycles, motorcycles, and automotive vehicles, for example.

Figure 2:
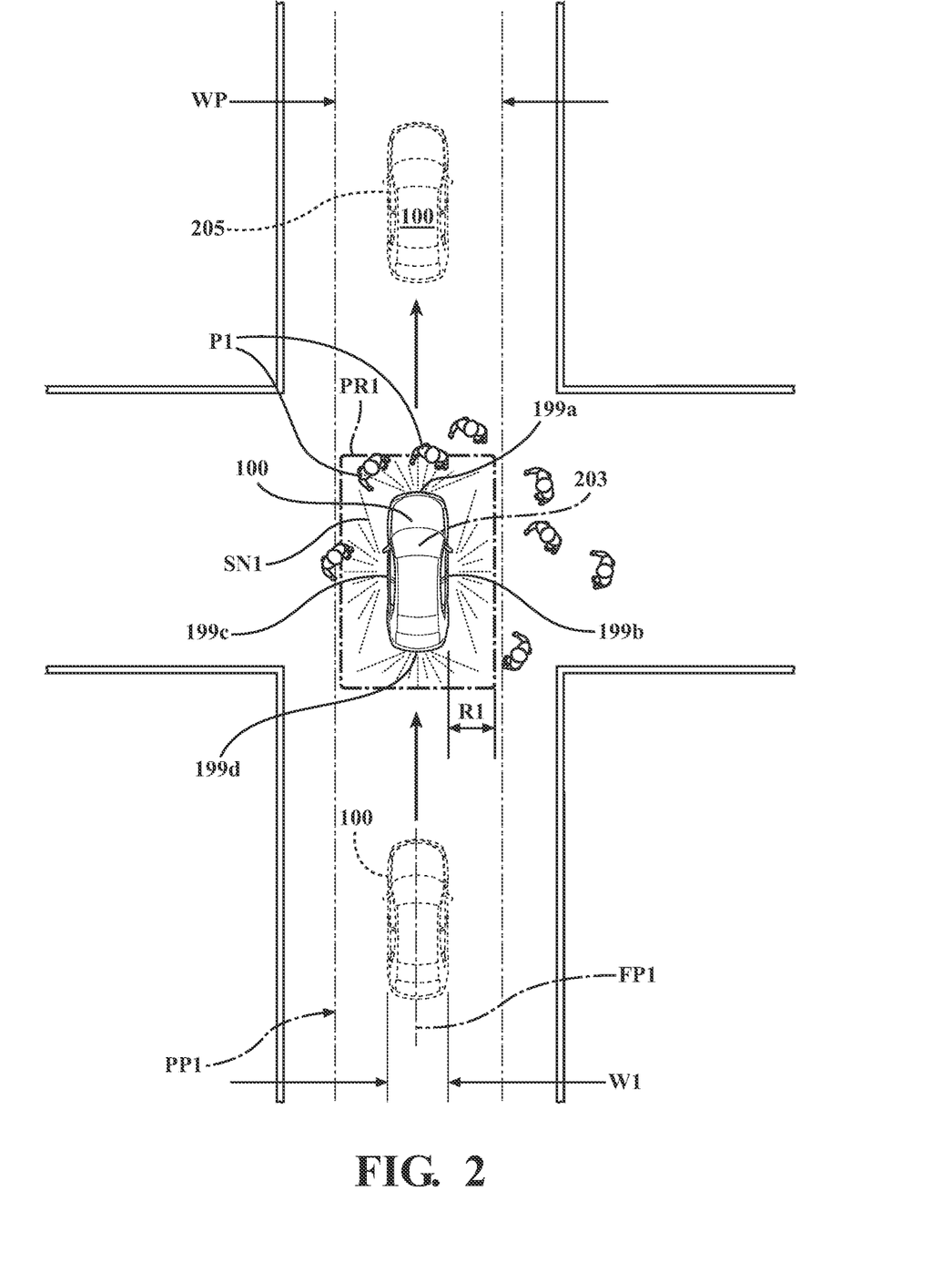
FIG. 2 is a schematic diagram showing operation of a secondary horn system to generate sound in a proximity alert space when a projected path of the vehicle is straight ahead through a crowded portion of the path.

Sound may be transmitted into an alert space by generating and projecting sound from a speaker configured to emit sound in a direction toward the alert space. Referring to FIG. 2, for example, in one or more arrangements, the secondary horn system 131 may include conventional speakers 199 distributed along the vehicle exterior and configured to transmit sound in directions outwardly from the vehicle exterior. In particular arrangements, the system 131 may include at least one conventional speaker 199*a* positioned along a front face of the vehicle for directing sounds in a forward direction of the vehicle. The system 131 may also include at least one conventional speaker 199*b* positioned along a right side of the vehicle for directing sounds into spaces along a right side of the vehicle. The system 131 may also include at least one conventional speaker 199*c* positioned along a left side of the vehicle for directing sounds into spaces along a left side of the vehicle. The system 131 may include at least one conventional speaker 199*d* positioned along a rear face of the vehicle for directing sounds in a rearward direction of the vehicle.

Figure 3:
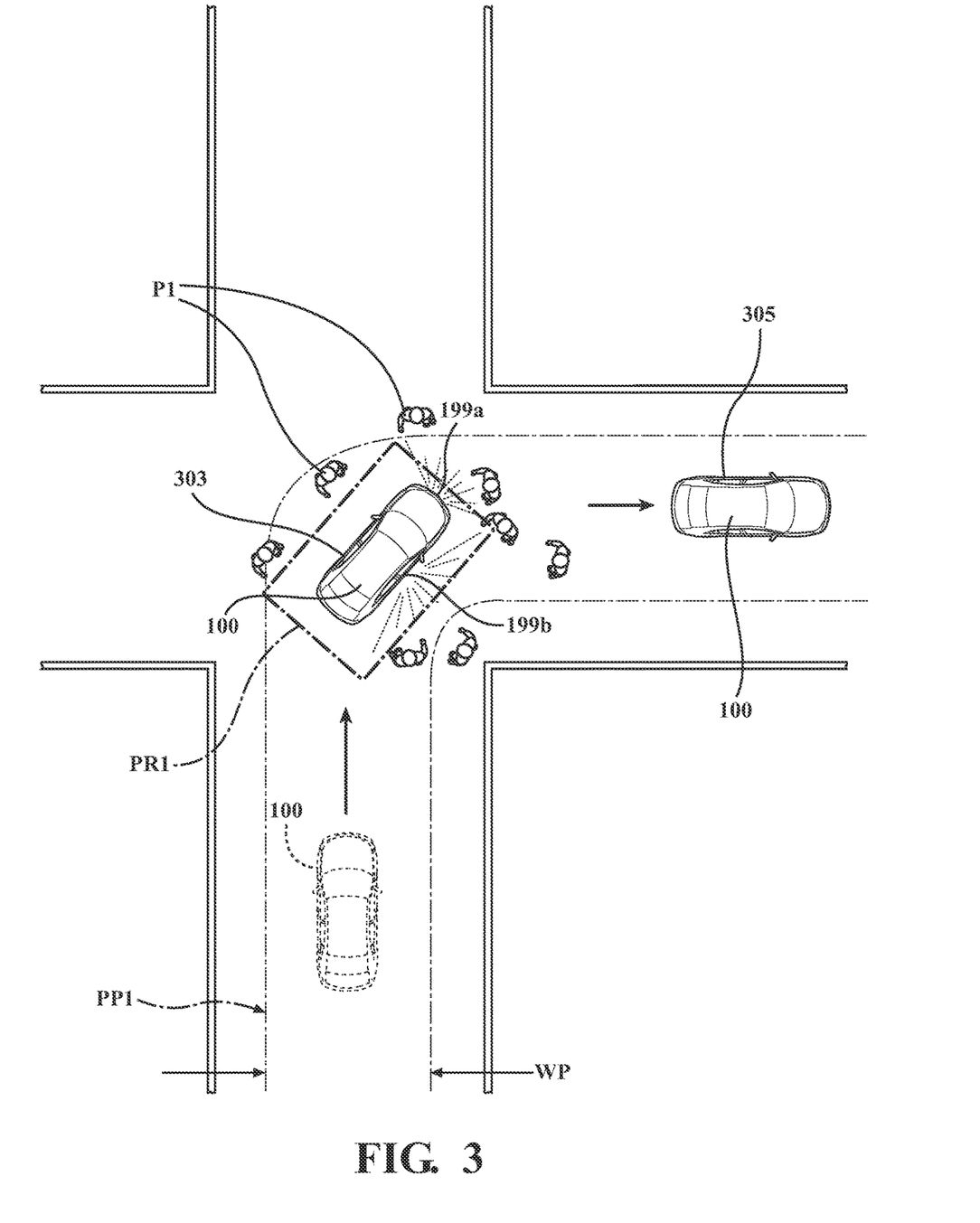
FIG. 3 is a schematic diagram showing operation of a secondary horn system to generate sound in a proximity alert space when the vehicle is turning.
Figure 4:
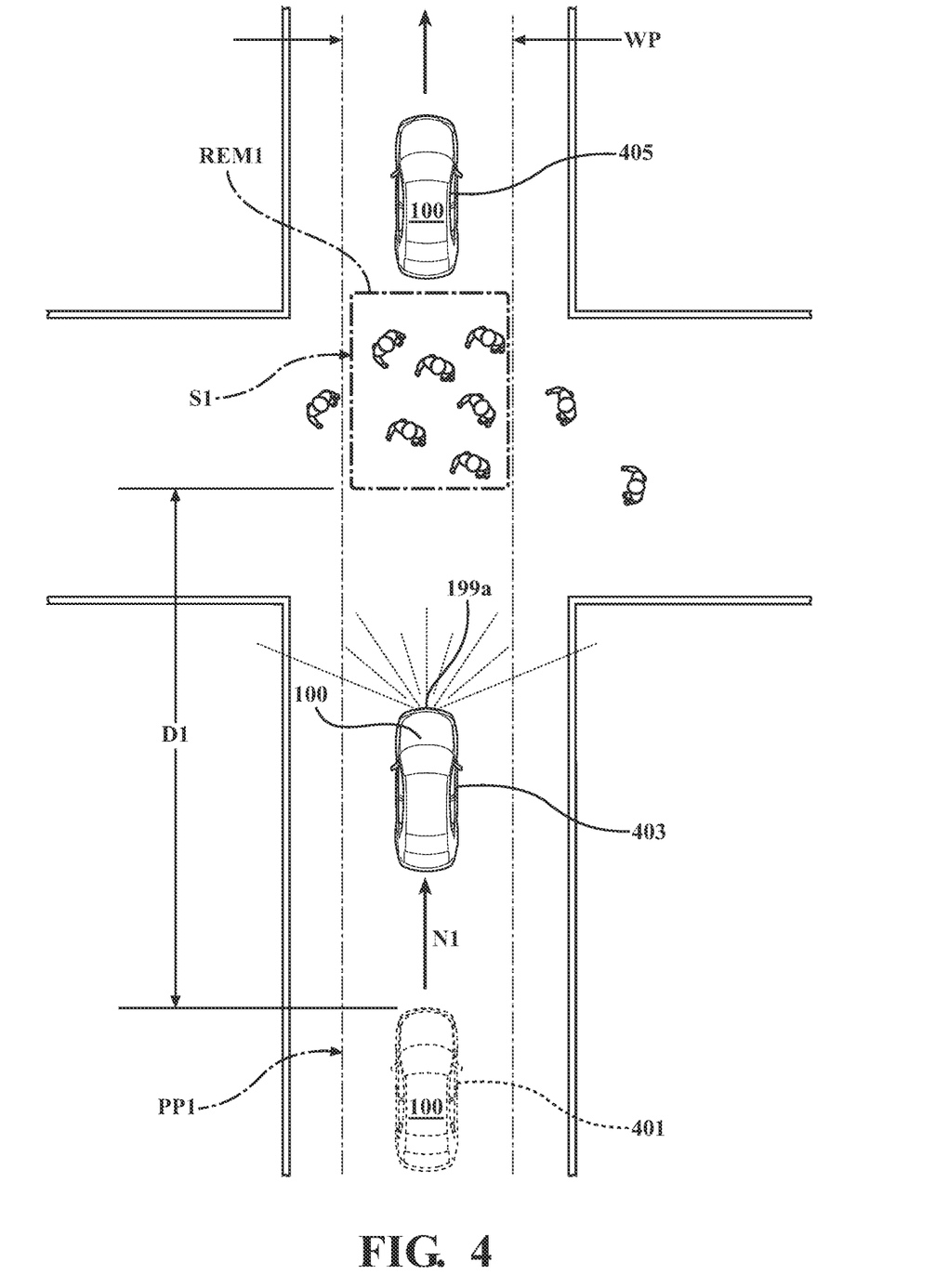
FIG. 4 is a schematic diagram showing operation of a secondary horn system to generate sound directed into a remote alert space when the remote alert space is determined to reside along the projected path of the vehicle.

A conventional speaker 199 may emit sound over a relatively wide arc and the speaker may be positioned and oriented so that at least a portion of the sound emitted from the conventional speaker is directed toward an alert space and enters the alert space. In this arrangement, for example, sound may be directed into a remote alert space (as shown in FIG. 4) located ahead of the vehicle in its projected path. Sound may also be directed into a proximity alert space (as shown in FIGS. 2 and 3) surrounding the vehicle as described herein.

External speakers may be nested or built into the vehicle exterior panels to promote aerodynamic efficiency, or (in the case of add-on speakers, for example) the speakers may extend to some degree from the overall vehicle exterior. The secondary horn system control module 124 may be configured to control operation of any speakers of the secondary horn system 131 to generate various different types of sounds, sound volumes, and patterns of sounds. Default settings of sound type, sound volume, and/or sound patterns may be used by the control module 124, or the sound type, sound volume, and/or sound patterns for various driving situations may be selectable by user. For example, sound frequencies may be controlled to produce relatively softer, less intrusive alert sounds for alerting pedestrians, or relatively harsher alert sounds to help promote greater awareness of the vehicle where necessary. In another example, sound patterns may be controlled to be continuous or pulsed. A user may specify the spacing or timing of the pulses. In yet another example, a relatively higher-volume sound may be transmitted using a directional speaker or in cases (such as in structure alert spaces) where it may be particularly important to alert other vehicles to the proximity of the vehicle 100.

In one or more arrangements, the secondary horn system may include one or more directional speakers 131*s*. Directional speakers may be used to focus the generated sound into a smaller arc, and transmit the sound to a greater distance, than may be feasible with conventional speakers. This may enable the alert sound to be confined to a specific area, for example, in cases where it is necessary to transmit a relatively loud or obnoxious sound in order to attract attention to the vehicle in a pending, possibly hazardous situation.

In particular arrangements, one or more of the directional speakers 131*s* may be mounted so as to be directionally controllable by the secondary horn system control module 1 24. For example, referring to FIG. 1, a directional speaker 131*s* may be incorporated into a directional speaker unit 131*d* mounted in a housing and operably coupled to a motor/gear mechanism 131*m* configured for controlling a direction in which the speaker 131*s* is facing relative to the vehicle 100 responsive to control commands from the secondary horn system control module 124. Control commands may be received through a wire or the commands may be wireless commands. The directional speaker unit may also include any additional hardware or software needed to receive control commands and control operation of the directional speaker unit and directional speaker as described herein. For example, the directional speaker unit 131*d* may include a wireless control interface 131*c* enable the directional speaker to be controlled using wireless commands.

In particular arrangements, the directional speaker unit 131*d* may have a dedicated processor (not shown) for purposes of alert space tracking and directional control of the directional speaker 131s. Alternatively, alert space tracking and directional control of the directional speaker may be implemented by processor(s) 110.

In particular embodiments, the control module 124 may include instructions that when executed by the processor(s) 110 cause the processor(s) to control operation of the directional speaker 131s to continue to transmit sound into an alert space as the vehicle 100 moves in a direction toward the structure alert space. In particular embodiments, the alert space may be a structure alert space such as alert space ST1 shown in FIG. 5. Thus, the directional speaker unit 131d may be configured to be controllable by the secondary horn system control module 124 to change the direction of transmission of the alert sound by the directional speaker 131s by rotating the directional speaker so that generated sound is continuously transmitted into the alert space as the vehicle moves, thereby keeping the directional speaker focused on a particular alert space during movement of the vehicle. For example, the directional speaker 131s may be coupled to a motor/gear system 131e structured to enable the directional speaker 131s to swivel in a desired direction responsive to control commands. This capability enables an alert sound to be directed continuously into an alert space as the vehicle 100 moves along its projected path PP1 and an angular orientation of the vehicle with respect to the alert space changes. Thus, for example, referring to FIG. 5, an alert sound may be transmitted into a structure alert space ST1 located a distance forward of the vehicle as described herein, and transmission of the alert sound into the structure alert space may be maintained as the vehicle moves closer and closer to the alert space. This may provide a focused alert sound directed to current or future occupants of the alert space, thereby alerting any occupant to the approach of the vehicle well in advance of the vehicle passing by or through or adjacent the targeted alert space. To this end, the secondary horn system control module 124 may be configured to operate in cooperation with the navigation system 147 and/or with other in-vehicle or remote system(s) to control the directional speaker unit 131d to keep the directional speaker 131s pointed at the coordinates describing the location of the alert space as the vehicle moves.

The directional speaker unit 131d and the secondary horn system 131 may also include any additional hardware and/or software elements needed to control the operation of the various speakers as described herein. In embodiments described herein, after the vehicle 100 has moved along its projected path far enough so that the designated alert space is no longer along the projected path, transmission of alerts sounds into the alert space may be discontinued.

Speakers for the secondary horn system 131 may be designed into the vehicle installation during vehicle fabrication, or the speakers may be externally mountable and/or otherwise retrofittable as speaker units to the vehicle as an after-market addition. Speakers/speaker units may be configured for mounting along (or adjacent) any desired portion of the vehicle exterior according to user preferences, vehicle exterior configuration, and other pertinent factors.

The vehicle 100 can include one or more actuators 150. The actuators 150 can be any element or combination of elements operable to modify, adjust and/or alter one or more of the vehicle systems 140 or components thereof to responsive to receiving signals or other inputs from the processor(s) 110, any of the modules stored in memory 112, and/or any other vehicle components or systems. Any suitable actuator can be used. For instance, the one or more actuators 150 can include motors, pneumatic actuators, hydraulic pistons, relays, solenoids, and/or piezoelectric actuators, just to name a few possibilities.

The vehicle 100 can include one or more modules, at least some of which are described herein. The modules can be implemented as computer-readable program code that, when executed by processor(s) 110, implement one or more of the various processes described herein. One or more of the modules can be a component of the processor(s) 110, or one or more of the modules can be executed on and/or distributed among other processing systems to which the processor(s) 110 is operably connected. The modules can include instructions (e.g., program logic) executable by one or more processor(s) 110. Alternatively, or in addition, one or more of data store(s) 115 or another portion of the vehicle 100 may contain such instructions.

Generally, a module, as used herein, includes routines, programs, objects, components, data structures, and so on that perform particular tasks or implement particular data types. In further aspects, a memory generally stores the noted modules. The memory associated with a module may be a buffer or cache embedded within a processor, a RAM, a ROM, a flash memory, or another suitable electronic storage medium. In still further aspects, a module as envisioned by the present disclosure is implemented as an application-specific integrated circuit (ASIC), a hardware component of a system on a chip (SoC), as a programmable logic array (PLA), or as another suitable hardware component that is embedded with a defined configuration set (e.g., instructions) for performing the disclosed functions.

In one or more arrangements, one or more of the modules described herein can include artificial or computational intelligence elements, e.g., neural network, fuzzy logic or other machine learning algorithms. Further, in one or more arrangements, one or more of the modules can be distributed among a plurality of the modules described herein. In one or more arrangements, two or more of the modules described herein can be combined into a single module.

In embodiments described herein, a memory 112 may store autonomous driving module(s) 160 and a secondary horn system control module 124. The memory 112 is a random-access memory (RAM), read-only memory (ROM), a hard-disk drive, a flash memory, or other suitable memory for storing the modules 160, 124. The modules 160, 124 are, for example, computer-readable instructions that when executed by the processor 110, cause the processor(s) 110 to perform the various functions disclosed herein. Additional modules (not shown) may also be stored in memory 112.

The vehicle 100 can include one or more autonomous driving modules 160. The autonomous driving module(s) 160 can be configured to receive data from the sensor system 120 and/or any other type of system capable of capturing information relating to the vehicle 100 and/or the external environment of the vehicle 100. The autonomous driving module(s) 160 can determine position and velocity of the vehicle 100. The autonomous driving module(s) 160 can determine the location of obstacles, obstacles, or other environmental features including traffic signs, trees, shrubs, neighboring vehicles, pedestrians, etc. The autonomous driving module(s) 160 can be configured to receive, and/or determine location information for obstacles within the external environment of the vehicle 100 for use by the processor(s) 110, and/or any other module described herein to estimate position and orientation of the vehicle 100, vehicle position in global coordinates based on signals from a plurality of satellites, or any other data and/or signals that could be used to determine the current state of the vehicle 100 or determine the position of the vehicle 100 with respect to its environment for use in either creating a map or determining the position of the vehicle 100 in respect to map data.

The autonomous driving module(s) 160 can be configured to determine travel path(s), current autonomous driving maneuvers for the vehicle 100, future autonomous driving maneuvers and/or modifications to current autonomous driving maneuvers based on data acquired by the sensor system 120 and/or information received from a navigation system, such as navigation system 147. "Driving maneuver" means one or more actions that affect the movement of a vehicle. Examples of driving maneuvers include: accelerating, decelerating, braking, turning, moving in a lateral direction of the vehicle 100, changing travel lanes, merging into a travel lane, and/or reversing, just to name a few possibilities. The autonomous driving module(s) 160 can be configured can be configured to implement determined driving maneuvers. The autonomous driving module(s) 160 can cause, directly or indirectly, such autonomous driving maneuvers to be implemented. As used herein, "cause" or "causing" means to make, force, compel, direct, command, instruct, and/or enable an event or action to occur or at least be in a state where such event or action may occur, either in a direct or indirect manner.

The autonomous driving module(s) 160 can be configured to execute various vehicle functions and/or to transmit data to, receive data from, interact with, and/or control the vehicle 100 or one or more systems thereof (e.g., one or more of vehicle systems 140). The autonomous driving module(s) 160 may be configured to autonomously control the vehicle 100 so as to drive the vehicle along a projected path, from an initial or start location to a destination.

The processor(s) 110, the autonomous driving module 160, the secondary horn system control module 124 and/or any other vehicle modules can be operably connected to communicate with each other and with the other elements of the vehicle, including various vehicle systems 140 and/or individual components thereof. For example, referring to FIG. 1, the processor(s) 110 and the autonomous driving module(s) 160 can be in communication to send and/or receive information from the various vehicle systems 140 to control the movement, speed, maneuvering, heading, direction, etc. of the vehicle 100. The processor(s) 110, the autonomous driving module(s) 160, the secondary horn system control module 124, and/or other elements of the vehicle may control some or all of the vehicle systems 140 and, thus, may be partially or fully autonomous.

The processor(s) 110, the autonomous driving module(s) 160, and the navigation system 147 may be operable to control the navigation and/or maneuvering of the vehicle 100 by controlling one or more of the vehicle systems 140 and/or components thereof. For instance, when operating in an autonomous mode, the processor(s) 110 and/or the autonomous driving module(s) 160 can control the direction and/or speed of the vehicle 100. The processor(s) and/or the autonomous driving module(s) 160 can cause the vehicle 100 to accelerate (e.g., by increasing the supply of fuel provided to the engine), decelerate (e.g., by decreasing the supply of fuel to the engine and/or by applying brakes) and/or change direction (e.g., by turning the front two wheels).

As stated previously, the vehicle 100 can include a secondary horn system control module 124 configured to control operation of the secondary horn system 131. The control module 124 may include instructions that when executed by the processor cause the processor to determine a presence of an alert space along a projected path PP1 of the vehicle. The control module 124 may also include instructions to, responsive to a determination of the presence of an alert space, control operation of a vehicle secondary horn system 131 to transmit a sound into the alert space. To determine the presence of alert spaces along the projected path, the control module 124 may receive and process data from sensor system 120 and information from other sources, such as navigation system 147, extra-vehicular sensors (not shown) and/or data stores 115, for example.

The projected path PP1 of the vehicle 100 may be a planned route of the vehicle determined, for example, by the navigation system 147, either autonomously or responsive to a request from a user. If no planned route exists, the projected path PP1 may be a path in a forward direction of the vehicle 100 and determined by a direction in which the vehicle is currently moving or facing or turning. The projected path PP1 may have a width which is the same as a maximum width W1 (FIG. 2) of the vehicle (i.e., a maximum width of the vehicle along a direction extending perpendicular to a fore-aft plane FP1 of the vehicle. In particular arrangements, the projected path may have a width WP (FIG. 2) equal to a maximum width of the vehicle 100 plus an additional predetermined distance from each side of the vehicle. This may provide an extra clearance or safety zone for purposes of determining alert spaces as described herein and decision-making responsive to the presence of alert spaces. The projected path PP1 of the vehicle 100 may include any space the vehicle currently occupies.

An object or feature may be considered to be in the projected path PP1 if the entire object/feature or at least a portion of the object/feature resides within boundaries of the projected path. An object or feature may be considered to be along the projected path PP1 if the entire object/feature or at least a portion of the object/feature resides within boundaries of the projected path or outside the projected path but within a predetermined distance of the projected path.

An alert space is a space along a projected path of the vehicle into which an alert or warning sound may be projected. The secondary horn system control module 124 may be configured to control operation of the secondary horn system 131 to transmit a warning or alert sound into an alert space, to draw attention to the vehicle 100 as it moves or attempts to move through a crowd or an area into which other vehicles may attempt to drive if they are not aware of the vehicle 100. In one or more arrangements, the transmitted sounds may have characteristics be designed to attract attention to the vehicle 100 and maintain attention on the vehicle without surprising, offending, or unduly distracting people and/or animals in the alert space. The sounds may be transmitted into the alert space while the vehicle 100 is slowly moving or attempting to move forward, to convey to people that the vehicle is attempting to move forward in a straight or turning direction of the vehicle, and so that people in the alert space may accommodate attempted motion of the vehicle by stopping, moving out of the path of the vehicle and/or giving the vehicle a wider berth. Although several examples of types of alert spaces are described herein, the secondary horn system control module 124 may also (or alternatively) be configured to determine the presence of, and respond to, any of a variety of other types of alert spaces the vehicle 100 may encounter.

Sensor system 120 may continuously scan the vehicle environment for conditions indicating the presence of alert spaces and any changes in types of alert spaces. Also, map information (either stored or extra-vehicular) may be accessed, if available, to help determine if alert spaces may exist along the vehicle projected path PP1 but outside the sensor envelopes of the vehicle environment sensors 122. Generally, when conditions prompting the transmission of sound into an alert space have been met, the secondary horn system control module 124 described herein may control the secondary horn system 131 to transmit sound into the alert space until the alert space is no longer in the projected path of the vehicle 100 (i.e., until the vehicle has moved along the projected path past the alert space or until the conditions indicating the presence of the alert space no longer exist).

In one or more arrangements, the control module 124 may be configured to determine, based on information regarding the vehicle environment, the presence of a proximity alert space along a projected path PP1 of the vehicle 100. A proximity alert space PR1 may be a space envelope having predetermined boundaries and enclosing the vehicle 100 and in which a number of objects currently within the defined space and exterior of the vehicle exceeds a predetermined threshold. In one or more arrangements, the proximity alert space PR1 may have boundaries at a predetermined distance R1 from the vehicle along each side (front, right, left, and rear) of the vehicle as shown in FIG. 2. The vehicle 100 may encounter (and determine the presence of) a proximity alert space PR1 when, for example, the vehicle is stopped at (or proceeding slowly through) an intersection and at least a predetermined threshold number of people P1 enter the space envelope/proximity alert space PR1 defined by the predetermined distance R1 extending from all sides of the vehicle. In FIG. 2, this is shown occurring when the vehicle 100 is in location 203. This type of situation may occur in many countries or localities with high urban population densities, when a large number of people are constantly crossing a street at an intersection and the vehicle is trying to navigate through the crowds to proceed along its path.

While attempting to move forward in through the crowd, the vehicle 100 may need to slow or stop frequently while still alerting and reminding people of its presence and indicating that the intent of the vehicle is to continue to move forward. When the number of objects (such as people and pets) currently within the predetermined distance R1 from the vehicle along its front and sides exceeds the predetermined threshold, it may be determined that the area surrounding the vehicle has become so crowded that further forward progress of the vehicle will be impeded. In this case, the secondary horn system control module 124 may determine the presence of a proximity alert space PR1 around the vehicle 100 and may, in response, autonomously control operation of the secondary horn system 131 to generate any of various types of alert sounds. An object may be determined to be inside the proximity alert space if any portion of the object is determined to be in the alert space.

In particular arrangements, the dimensions of the proximity alert space PR1 may be defined within a certain range of values by a user. For example, the user may specify (within a certain range) a distance R1 to which the alert space boundaries may extend from the vehicle.

Referring to FIG. 2, the control module 124 may include instructions to, responsive to the determination of the presence of a proximity alert space PR1 in a case where the vehicle 100 is not currently turning, control operation of the secondary horn system 131 to transmit omni-directional sounds SN1 into the alert space PR1. Omni-directional sounds SN1 may be sounds emitted from at least portions of the vehicle facing forward of the vehicle, toward a left side of the vehicle, and toward a right side of the vehicle. In particular arrangements, omni-directional sounds may also include sounds emitted from a portion of the vehicle facing rearwardly of the vehicle. In one or more arrangements, these sounds may be transmitted from conventional speakers (such as speakers 199*a*, 199*b*, 199*c*, 199*d*), thereby emitting the sounds over a wide arc to warn as many people as possible in a crowd surrounding the vehicle 100 that the vehicle is present and attempting to move through the crowd.

FIG. 2 shows a proximity alert space PR1 having a dimension substantially equal to a width WP of the projected path PP1. However, the boundaries of the proximity alert PR1 space may alternatively extend outside the boundaries of the projected path. The vehicle 100 may be sitting in or slowly moving from location 203 in the direction of location 205. When a number of objects currently within the alert space PR1 exceeds the predetermined threshold (due to people walking and/or standing within the distance R1 of the vehicle 100, for example), the control module 124 may control operation of the secondary horn system 131 to transmit omni-directional sounds SN1 into the alert space PR1.

Transmission of the sounds SN1 may continue while the vehicle 100 is stationary or moving as long as the predetermined object threshold is exceeded within the defined space. When alert this condition no longer exists (for example, when the crowd around the vehicle has sufficiently thinned or when the vehicle has moved past the crowd (as for example, to location 205 of FIG. 2)), the predetermined object threshold within the defined space may no longer be exceeded. Then the alert space is no longer present and transmission of the sounds SN1 may be discontinued.

FIG. 3 shows the vehicle 100 in the proximity alert space PR1 of FIG. 2 and where the vehicle is turning to the right (at location 303). Referring to FIG. 3, the control module 124 may include instructions to, responsive to the determination of the presence of a proximity alert space PR1 while the vehicle is attempting to turn, control operation of the secondary horn system 131 to transmit a sound into the alert space from a front of the vehicle (from speaker 199*a*) and from a side of the vehicle (from speaker 199*b*) in a direction toward which the vehicle is turning.

In particular arrangements, the sound emitted from the side of the vehicle may have a different characteristics than the sound emitted from the front of the vehicle. For example, the pitch and/or volume of the sound emitted from the vehicle side may be different, or the sound emitted from the side may be pulsed. This may have the effect if drawing particular attention to the side of the vehicle toward which the vehicle is turning.

Again, transmission of the sound may continue while the vehicle is stationary or moving as long as the predetermined object threshold is exceeded within the defined space PR1. When this condition no longer exists (for example, when the crowd around the vehicle has sufficiently thinned or when the vehicle has moved past the crowd, as when the vehicle has proceeded to location 305), the predetermined object threshold within the defined space may no longer be exceeded. Then transmission of the sound may be discontinued.

Referring now to FIG. 4, in one or more arrangements, the control module 124 may be configured to determine, based on information regarding the vehicle environment, the presence of a remote alert space REM1 along the projected path PP1 of the vehicle. A remote alert space may be a space along the projected path of the vehicle having predetermined dimensions and in which a number of detected objects remains above a predetermined threshold, from a time at which objects are detected in the space, until a time when the vehicle reaches a location at a predetermined distance from the space.

One example of determination of a remote alert space is illustrated in FIG. 4. As the vehicle 100 moves in direction N1 along the projected path PP1, sensors of the sensor system 120 may continuously scan ahead of the vehicle. The environment sensors 122 may detect one or more objects P1 along the projected path. Sensor data may be analyzed to estimate a number of objects and a distance of each object from the vehicle. If a number of detected objects residing within a space S1 having predetermined dimensions is above a predetermined threshold number of objects, the sensors may monitor the space to determine if the number of objects in the space S1 remains above the predetermined threshold while the vehicle 100 is approaching the space. If the number of objects in the space S1 remains above the threshold until the vehicle reaches a location 401 at a predetermined distance D1 from the space S1, the control module 124 may determine that a remote alert space REM1 is present along the projected path of the vehicle (i.e., the observed space S1 becomes an alert space REM1). A condition where the number of objects within a space remains above the threshold as the vehicle moves toward the space may occur where, for example, a constant flow of pedestrians is traversing the space S1, or a cluster of pedestrians is standing in the space S1. If the number of objects in the space has remained above the threshold until the vehicle reaches the predetermined distance D1 from the space and the presence of a remote alert space REM 1 has been determined, the control module 124 may control operation of the secondary horn system 131 to transmit a sound into the alert space REM1 when the vehicle reaches the location at the predetermined distance D1 from the alert space. In one or more arrangements, the sound may be transmitted into the alert space S1 by emitting a sound from the front of the vehicle in a forward direction of the vehicle. This may provide advance notice to the objects in space S1 that a vehicle is approaching. This may enable objects in the remote alert space to move out of the vehicle's path prior to the vehicle actually reaching the alert space.

Transmission of the sound into the alert space REM1 may continue until the alert space is no longer along the projected path of the vehicle (for example, when the vehicle 100 is at location 405 father along the projected path PP1). Location 403 represents a location of the vehicle intermediate location 401 and location 405. At some point during the vehicle transiting the alert space REM1, if the objects (i.e., people) do not move out of the vehicle's path, a situation as shown in FIG. 2 may be created where the vehicle 100 determines that a proximity alert space exists. If this occurs, omnidirectional alert sounds may be transmitted into the new proximity alert space as previously described.

In one or more arrangements, the predetermined dimensions of the space S1 may be determined by a width dimension WP of the projected path (e.g., the space S1 may be a space extending upwardly from a road area of WP×WP and including any objects determined to be residing in this area). However, the evaluated object space S1 may have any dimensions suitable for the purposes described herein, consistent with sensor operational capabilities and other pertinent factors.

Figure 5:
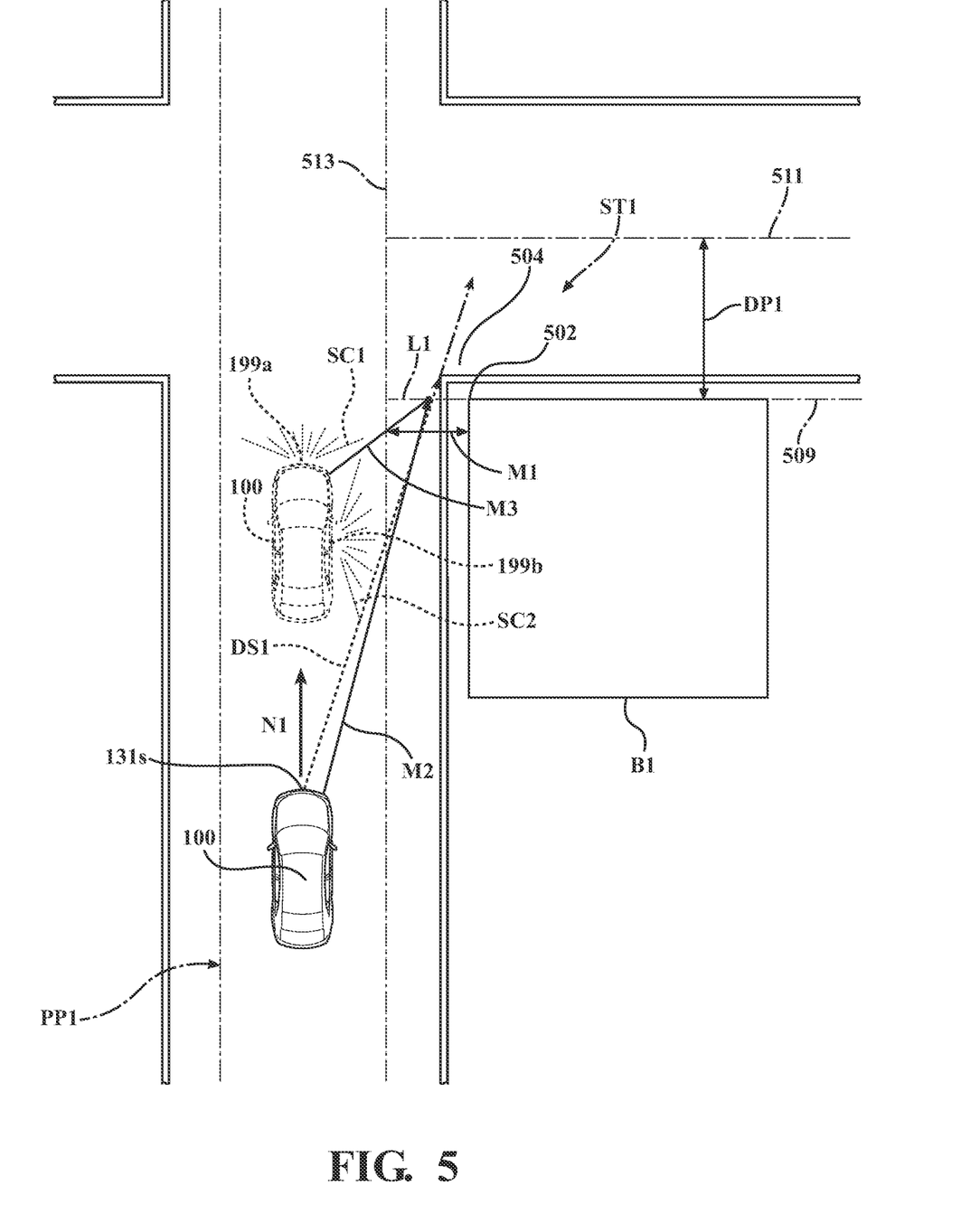
FIG. 5 is a schematic diagram showing operation of a secondary horn system to generate sound directed into a structure alert space when the structure alert space is determined to reside along the projected path of the vehicle.

Referring now to FIG. 5, in one or more arrangements, the control module 124 may be configured to determine, based on information regarding the vehicle environment, the presence of a structure alert space ST1 along the projected path PP1 of the vehicle 100. A structure alert space may be a space including a farthest location along the projected path PP1 of the vehicle at which a portion of a given structure resides within a predetermined distance of the projected path.

One example of determination of a structure alert space is illustrated in FIG. 5. As the vehicle 100 moves in direction N1 along the projected path PP1, sensors of the sensor system 120 may continuously scan ahead of the vehicle. The sensors may detect one or more structures (such as a building B1) along the projected path. Map information including locations and features along the projected path may also be accessed (if available). The pertinent map information may include locations, dimensions, boundaries of various structures residing along the projected path of the vehicle, and/or other information enabling determination of spatial relationships between the structures and a road surface along the projected path PP1 on which the vehicle 100 will be driving. The map information may be stored in map data 161 in data stores 115, for possible use when connections for GPS or other navigational systems are unavailable or when complete information relating to the projected path is unavailable.

Either of the control module 124 and the vehicle navigation system 147 (or both the control module 124 and the vehicle navigation system in cooperation) may be configured to determine distances between the projected path and structures residing along the projected path. In some situations or localities, the boundaries between driving areas and pedestrian areas adjacent a structure may be unclear or non-existent. In the situation shown in FIG. 5, beyond the farthest location along the path PP1 where a portion of the structure B1 (in FIG. 5, building corner 502) is within a predetermined distance M1 of the projected path, a cross-street or sidewalk 504 may extend adjacent the structure B1. If a portion of a structure B1 is within a predetermined distance M1 of an area traversed by motor vehicles, a pedestrian or vehicle moving from behind the structure B1 toward projected path PP1 may have insufficient notice of the approach or presence of the vehicle 100. Thus, in such a case, the control module 124 may be configured to determine that a structure alert space (such as space ST1 in FIG. 5) is present along the projected path PP1 of the vehicle. The structure alert space ST1 may include a space between the projected path PP1 of the vehicle and the portion 502 of the structure B1 within the predetermined distance M1 of the projected path PP1 that is farthest-ahead of the vehicle 100 along the projected path.

In particular arrangements, as shown in FIG. 5, the structure alert space ST1 may be bounded on one side by a vertical plane 509 extending through both the projected path PP1 of the vehicle and the portion 502 of the structure B1 within the predetermined distance M1 of the projected path PP1 at the location that is farthest-ahead of the vehicle 100 along the projected path, and on another side by a vertical plane 513 extending along an edge of the projected path PP1 and intersecting the plane 509. For purposes of discontinuing the transmission of sound into the structure alert space, the structure alert space may also be bounded by another vertical plane 511 extending parallel to the plane 509 and spaced apart a predetermined distance DP1 from the plane 509. Thus, in particular arrangements, the secondary horn system may be controllable to discontinue transmission of sound into the alert space ST1 after the vehicle 100 has passed plane 511 when moving along projected path PP1. In other particular arrangements, the secondary horn system may be controllable to discontinue transmission of sound into the alert space ST1 after the vehicle 100 has passed plane 509 when moving along projected path PP1.

Referring to FIG. 5, for cases where the secondary horn system 131 uses only conventional speakers, the secondary horn system control module 124 may be configured to, responsive to a determined presence of a structure alert space ST1, control operation of the secondary horn system 131 to transmit sounds SC1 and SC2 into the structure alert space ST1 from conventional speakers 199a and 199b when the vehicle 100 reaches a location that is a first predetermined distance M3 from the structure alert space. In one or more arrangements, the distance from the vehicle to the structure alert space ST1 may be a taken as a horizontal distance from any selected location on the vehicle 100 to a vertical line extending along a midpoint of a horizontal distance L1 between the portion 502 of the structure B1 and a location along the plane 513 positioned closest to the portion 502 of the structure B1. The distance from the vehicle to the structure alert space ST1 may be determined using any of a variety of alternative methods, if consistent with the operations described herein.

To avoid longer-term transmission of a relatively loud alert sound, and because the origin of the sound may be more difficult to determine when the sound is farther away due to reflection off of other structures, an alert sound from conventional speaker(s) may be transmitted into the structure alert space ST1 when the vehicle 100 is at a first, relatively shorter predetermined distance M3 from the structure alert space. Transmission of the sound by the secondary speaker system 131 into the structure alert space ST1 may be discontinued when the structure alert space is no longer along the projected path PP1 of the vehicle.

Referring again to FIG. 5, for cases where the secondary horn system incorporates one or more directional speakers 131s, the secondary horn system control module 124 may be configured to, responsive to a determined presence of a structure alert space ST1, control operation of the secondary horn system 131 to transmit a sound DS1 into the structure alert space ST1 using a directional speaker when the vehicle reaches a second predetermined distance M2 from the structure alert space, where the distance M2 is greater than the distance M3. In one or more arrangements, the focused sound DS1 may also be targeted at the vertical line extending along the midpoint of the horizontal distance L1 used as previously described to determine the distance to the alert space, thereby spacing the focused sound apart from the structure B1. This line of transmission may emit the focused sound into the space ST1.

In this operational mode, using the greater range of the directional speaker 131s, the secondary horn system may begin to transmit a sound into the alert space at a location relatively farther away from the alert space. In addition, the focus or directionality of the sound DS1 may prevent a "noise pollution" effect that may be produced by transmission of sound from a conventional speaker in all directions as the vehicle moves toward the structure alert space. The directional sound DS1 may extend into and through the alert space ST1, thereby conveying the warning sound to pedestrians and vehicles located on a cross-street or sidewalk 504 positioned on a far side of the structure.

Also, in embodiments where the directional speaker 131s is configured for directional tracking control, the secondary horn system control module 124 may be configured to control operation of the directional speaker unit to continue to transmit sound from the directional speaker 131s into the structure alert space ST1 as the vehicle moves from the second predetermined distance in a direction toward the structure alert space. Transmission of the sound by the directional speaker 131s into the structure alert space ST1 may then be discontinued when the vehicle 100 is within the first predetermined distance M1 from the portion of the structure B1. At that point, sound may be transmitted into the structure alert space using conventional speakers as previously described.

Figure 6:
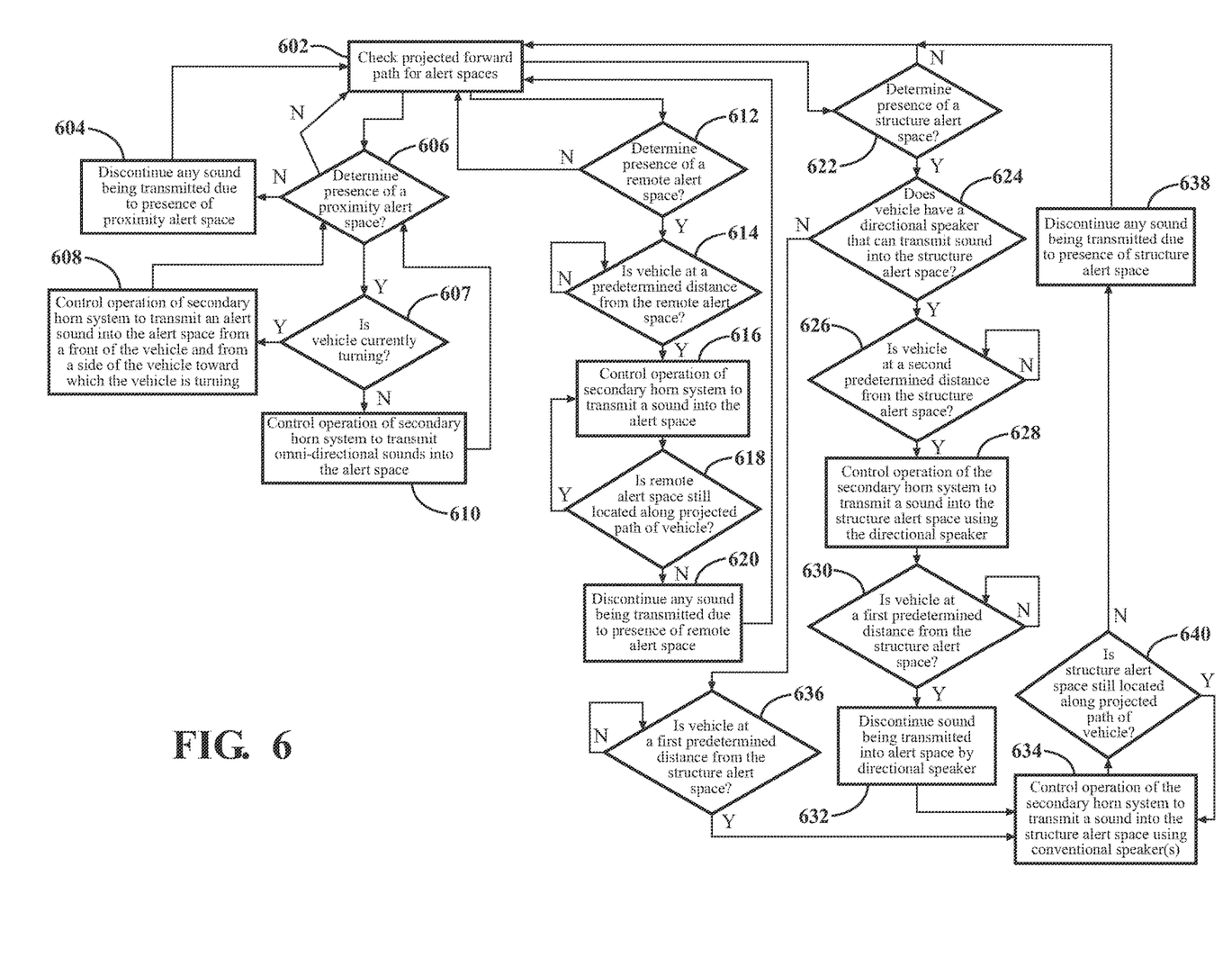
FIG. 6 is a flow diagram illustrating operation of an embodiment of a secondary horn system in various driving situations, in accordance with embodiments described herein

FIG. 6 is a flow diagram illustrating operation of an embodiment of the secondary horn system as described herein.

Referring to FIG. 6, in block 602, the secondary horn system control module 124 may continuously monitor for alert spaces along the projected path. To this end, the secondary horn system control module may evaluate data from sensor system 120 scanning the vehicle environment and the secondary horn system control module 124 and navigation system 147 may also cooperate to determine locations of known and possible alert spaces using map data. For example, referring to FIGS. 2 and 3, the secondary horn system control module 124 may (in block 606) monitor for the presence of a proximity alert space (i.e., the control module may determine if the vehicle 100 currently resides in a proximity alert space). If the vehicle is not currently in a proximity alert space, control may loop back to block 602 to continue to monitor for the presence of any alert space. However, if a proximity alert space is determined (in block 606) to be present (i.e., if the vehicle 100 is determined to be in a proximity alert space, such as space PR1 of FIG. 2) along the projected path of the vehicle, the secondary horn system control module 124 may (in block 607) determine if the vehicle is currently turning as shown in FIG. 3.

If the vehicle is currently turning, the secondary horn system control module 124 may (in block 608) control operation of the secondary horn system 131 to transmit an alert sound into the proximity alert space PR1 from a front of the vehicle and from a side of the vehicle toward which the vehicle is turning. The vehicle may be considered to be turning while in the proximity alert space if the vehicle front wheels are turned at so as to guide the vehicle in a direction other than straight ahead, for example. Control may then pass back to block 606, following which the loop 606-607-608 may be repeated to continuously transmit alert sounds into the alert space as long as the vehicle is in a proximity alert space and is turning.

Returning to block 607, if the vehicle is in a proximity alert space but not turning (as shown in FIG. 2), the secondary horn system control module 124 may (in block 610) control operation of the secondary horn system 131 to transmit omni-directional sounds into the alert space. These sounds may be transmitted into the alert space using conventional external speakers (such as speakers 199a, 199b, 199c, and 199d) distributed along the vehicle exterior as previously described. Control may then pass back to block 606, following which the loop 606-608-610 may be repeated to continuously transmit sounds into the alert space as long as the vehicle is in a proximity alert space and is not turning.

Returning to block 606, if at any time it is determined that the vehicle 100 is no longer in the proximity alert space, the secondary horn system control module 124 may (in block 604) control operation of the secondary horn system 131 to discontinue any sound being transmitted due to the presence of the proximity alert space. Control may then pass back to block 602 where the secondary horn system control module 124 may continue to monitor for alert spaces.

Referring to block 612 and also to FIG. 4, the secondary horn system control module may (in block 612) also determine if a remote alert space is present along a projected path of the vehicle as previously described. If a remote alert space is not present along a projected path of the vehicle, control may loop back to block 602 to continue to monitor for the presence of any alert space. However, if a remote alert space is present along a projected path of the vehicle, the secondary horn system control module may (in block 614) determine if the vehicle is at a predetermined distance from the remote alert space.

If the vehicle is not at a predetermined distance from the remote alert space, control may loop back to block 614 to continue to monitor the distance of the vehicle from the remote alert space. However, if the vehicle is at the predetermined distance from the remote alert space, the secondary horn system control module 124 may (in block 616) control operation of the secondary horn system to transmit a sound into the alert space. An example of this is shown in FIG. 4 where speaker 199a may be controlled by the secondary horn system control module to transmit a sound from speaker 199a when the vehicle 100 is a distance D1 from the remote alert space REM1.

The secondary horn system control module may then (in block 618) determine if the alert space is still along the projected path of the vehicle. If the alert space is still along the projected path of the vehicle, control may pass back to block 616 for execution of the loop 616-618 to transmit sound into the alert space continuously until the alert space is no longer along the projected path of the vehicle. However, if the alert space is no longer along the projected path of the vehicle, the secondary horn system control module 124 may (in block 620) control operation of the secondary horn system to discontinue any sound being transmitted due to the presence of the remote alert space. Control may then pass back to block 602 where the secondary horn system control module may continue to monitor for alert spaces.

Referring to block 622 and also to FIG. 5, the secondary horn system control module may also (in block 622) monitor for the presence of a structure alert space along a projected path of the vehicle. If a structure alert space is not present along a projected path of the vehicle, control may loop back to block 602 to continue to monitor for the presence of any alert space. However, if it is determined that a structure alert space is present along a projected path of the vehicle, the secondary horn system control module may (in block 624) determine if the secondary horn system includes a directional speaker that can transmit sound into the structure alert space.

If the secondary horn system does not include such a directional speaker, the secondary horn system control module may (in block 636) determine if the vehicle is at a first predetermined distance from the structure alert space. If the vehicle is not at the first predetermined distance from the structure alert space, control may loop back to block 636 until the vehicle is at the first predetermined distance from the structure alert space. When the vehicle 100 is at the first predetermined distance from the structure alert space, the secondary horn system control module may (in block 634) control operation of the secondary horn system to transmit a sound into the structure alert space using conventional speaker(s).

The secondary horn system control module 124 may then (in block 640) determine if the structure alert space is still along the projected path of the vehicle. if the alert space is still along the projected path of the vehicle, control may pass back to block 634 for execution of the loop 634-640 to continuously transmit sound into the structure alert space until the alert space is no longer along the projected path of the vehicle. However, if the alert space no longer along the projected path of the vehicle, the secondary horn system control module may (in block 638) discontinue any sound being transmitted due to presence of the structure alert space. Control may then pass back to block 602 where the secondary horn system control module 124 may continue to monitor for alert spaces.

Returning to block 624, if the secondary horn system includes directional speaker, the secondary horn system control module may (in block 626) determine if the vehicle 100 is at a second predetermined distance from the structure alert space. If the vehicle is not at the second predetermined distance from the structure alert space, control may loop back to block 626 until the vehicle is at the first predetermined distance from the structure alert space. However, if the vehicle is at the second predetermined distance from the structure alert space, the secondary horn system control module may (in block 628) control operation of the secondary horn system to transmit a sound into the structure alert space using the directional speaker.

The secondary horn system control module may then (in block 630) determine if the vehicle is at the first predetermined distance from the structure alert space. If the vehicle is not at the first predetermined distance from the structure alert space, control may loop back to block 630 until the vehicle is at the first predetermined distance from the structure alert space. When the vehicle is at the first predetermined distance from the structure alert space, the secondary horn system control module may (in block 632) control operation of the secondary horn system to discontinue sound being transmitted into the structure alert space by the directional speaker. Control may then proceed to block 634 and proceed from there as previously described.

Detailed embodiments are disclosed herein. However, it is to be understood that the disclosed embodiments are intended only as examples. Therefore, specific structural and functional details disclosed herein are not to be interpreted as limiting, but merely as a basis for the claims and as a representative basis for teaching one skilled in the art to variously employ the aspects herein in virtually any appropriately detailed structure. Further, the terms and phrases used herein are not intended to be limiting but rather to provide an understandable description of possible implementations. Various embodiments are shown in FIGS. 1-4, but the embodiments are not limited to the illustrated structure or application.

The flowcharts and block diagrams in the figures illustrate the architecture, functionality, and operation of possible implementations of systems, methods, and computer program products according to various embodiments. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved.

The systems, components and/or processes described above can be realized in hardware or a combination of hardware and software and can be realized in a centralized fashion in one processing system or in a distributed fashion where different elements are spread across several interconnected processing systems. Any kind of processing system or another apparatus adapted for carrying out the methods described herein is suited. A typical combination of hardware and software can be a processing system with computer-usable program code that, when being loaded and executed, controls the processing system such that it carries out the methods described herein. The systems, components and/or processes also can be embedded in a computer-readable storage, such as a computer program product or other data programs storage device, readable by a machine, tangibly embodying a program of instructions executable by the machine to perform methods and processes described herein. These elements also can be embedded in an application product which comprises all the features enabling the implementation of the methods described herein and, which when loaded in a processing system, is able to carry out these methods.

Furthermore, arrangements described herein may take the form of a computer program product embodied in one or more computer-readable media having computer-readable program code embodied, e.g., stored, thereon. Any combination of one or more computer-readable media may be utilized. The computer-readable medium may be a computer-readable signal medium or a computer-readable storage medium. The phrase "computer-readable storage medium" means a non-transitory storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: a portable computer diskette, a hard disk drive (HDD), a solid-state drive (SSD), a read-only memory (ROM), an erasable programmable read-only memory (EPROM or Flash memory), a portable compact disc read-only memory (CD-ROM), a digital versatile disc (DVD), an optical storage device, a magnetic storage device, or any suitable combination of the foregoing. In the context of this document, a computer-readable storage medium may be any tangible medium that can contain, or store a program for use by or in connection with an instruction execution system, apparatus, or device.

Generally, modules as used herein include routines, programs, objects, components, data structures, and so on that perform particular tasks or implement particular data types. In further aspects, a memory generally stores the noted modules. The memory associated with a module may be a buffer or cache embedded within a processor, a RAM, a ROM, a flash memory, or another suitable electronic storage medium. In still further aspects, a module, as envisioned by the present disclosure, is implemented as an application-specific integrated circuit (ASIC), a hardware component of a system on a chip (SoC), as a programmable logic array (PLA), or as another suitable hardware component that is embedded with a defined configuration set (e.g., instructions) for performing the disclosed functions.

Program code embodied on a computer-readable medium may be transmitted using any appropriate medium, including but not limited to wireless, wireline, optical fiber, cable, RF, etc., or any suitable combination of the foregoing. Computer program code for carrying out operations for aspects of the present arrangements may be written in any combination of one or more programming languages, including an object-oriented programming language such as Java™, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising (i.e., open language). The phrase "at least one of . . . and . . . " as used herein refers to and encompasses any and all possible combinations of one or more of the associated listed items. As an example, the phrase "at least one of A, B, and C" includes A only, B only, C only, or any combination thereof (e.g., AB, AC, BC or ABC).

Aspects herein can be embodied in other forms without departing from the spirit or essential attributes thereof. Accordingly, reference should be made to the following claims, rather than to the foregoing specification, as indicating the scope hereof.

What is claimed is:

1. A secondary horn system for a vehicle, the system being autonomously operable independently of, and in addition to, a conventional, manually-actuated horn system installed in the vehicle, the system comprising:
   at least one directional speaker;
   a processor; and
   a memory communicably coupled to the processor and storing a secondary horn system control module including instructions that when executed by the processor cause the processor to:
   determine a presence of a structure alert space along a projected path of the vehicle;
   responsive to a determination of the presence of a structure alert space:
      control operation of the secondary horn system to transmit a sound into the structure alert space when the vehicle reaches a location that is a first predetermined distance from the structure alert space; and
      control operation of the secondary horn system to transmit a sound into the structure alert space using the at least one directional speaker when the vehicle reaches a second predetermined distance from the structure alert space greater than the first predetermined distance as the vehicle is moving toward the structure alert space.

2. The system of claim 1 wherein the secondary horn system control module includes instructions that when executed by the processor cause the processor to control operation of the secondary horn system to discontinue transmission of the sound by the at least one directional speaker into the structure alert space when the vehicle reaches the first predetermined distance from the structure alert space.

3. The system of claim 1 wherein the secondary horn system control module includes instructions that when executed by the processor cause the processor to control operation of the at least one directional speaker to continue to transmit sound into the structure alert space as the vehicle moves from the second predetermined distance in a direction toward the structure alert space.

4. The system of claim 1 wherein the secondary horn system control module includes instructions that when executed by the processor cause the processor to
  determine a presence of a proximity alert space along a projected path of the vehicle; and
  responsive to the determination of the presence of a proximity alert space when the vehicle is not currently turning, control operation of the secondary horn system to transmit omni-directional sounds into the alert space.

5. The system of claim 1 wherein the secondary horn system control module includes instructions that when executed by the processor cause the processor to;
  determine a presence of a proximity alert space along a projected path of the vehicle; and
  responsive to the determination of the presence of a proximity alert space while the vehicle is turning, control operation of the secondary horn system to transmit a sound into the alert space from a front of the vehicle and from a side of the vehicle in a direction toward which the vehicle is turning.

6. The system of claim 1 wherein the secondary horn system control module includes instructions that when executed by the processor cause the processor to;
  determine a presence of a remote alert space along a projected path of the vehicle; and
  responsive to the determination of the presence of a remote alert space, control operation of the secondary horn system to transmit a sound into the remote alert space when the vehicle reaches a location that is a predetermined distance from the remote alert space.

7. The system of claim 6 wherein the secondary horn system control module includes instructions that when executed by the processor cause the processor to control operation of the secondary horn system to discontinue transmission of the sound into the alert space when the remote alert space is no longer along the projected path of the vehicle.

8. The system of claim 1 wherein the secondary horn system control module includes instructions that when executed by the processor cause the processor to control operation of the secondary horn system to discontinue transmission of the sound by the secondary horn system into the structure alert space when the structure alert space is no longer along the projected path of the vehicle.

9. A method of controlling a secondary horn system of a vehicle, the system being autonomously operable independently of, and in addition to, a conventional, manually-actuated horn system installed in the vehicle, the method comprising steps of:
  determining a presence of a structure alert space along a projected path of the vehicle; and
  responsive to the determination of the presence of a structure alert space, controlling operation of the secondary horn system to:
  transmit a sound into the structure alert space when the vehicle reaches a location that is a first predetermined distance from the structure alert space; and
  transmit a sound into the structure alert space using at least one directional speaker when the vehicle reaches a second predetermined distance from the structure alert space greater than the first predetermined distance as the vehicle is moving toward the structure alert space.

10. The method of claim 9, further comprising steps of:
  determining a presence of a proximity alert space along a projected path of the vehicle; and
  responsive to the determination of the presence of a proximity alert space when the vehicle is not currently turning, controlling operation of the secondary horn system to transmit omni-directional sounds into the alert space.

11. The method of claim 9, further comprising steps of:
  determining a presence of a proximity alert space along a projected path of the vehicle; and
  responsive to the determination of the presence of a proximity alert space while the vehicle is turning, controlling operation of the secondary horn system to transmit a sound into the alert space from a front of the vehicle and from a side of the vehicle toward which the vehicle is turning.

12. The method of claim 9, further comprising the steps of:
  determining a presence of a remote alert space along a projected path of the vehicle; and
  responsive to the determination of the presence of a remote alert space, controlling operation of the secondary horn system to transmit a sound into the alert space when the vehicle reaches a location that is a predetermined distance from the alert space.

13. A non-transitory computer-readable medium for controlling a secondary horn system of a vehicle and storing instructions that when executed by one or more processors cause the one or more processors to:
  determine a presence of a structure alert space along a projected path of the vehicle; and
  responsive to a determination of the presence of a structure alert space, control operation of the vehicle secondary horn system to:
  transmit a sound into the structure alert space when the vehicle reaches a location that is a first predetermined distance from the structure alert space; and
  transmit a sound into the structure alert space using at least one directional speaker when the vehicle reaches a second predetermined distance from the structure alert space greater than the first predetermined distance as the vehicle is moving toward the structure alert space.

14. The non-transitory computer-readable medium of claim 13, wherein the instructions to control operation of a vehicle secondary horn system further include instructions to:
  determine a presence of a proximity alert space along a projected path of the vehicle; and
  responsive to the determination of the presence of a proximity alert space when the vehicle is not currently turning, control operation of the secondary horn system to transmit omni-directional sounds into the alert space.

15. The non-transitory computer-readable medium of claim 13, wherein the instructions to control operation of a vehicle secondary horn system further include instructions to;
  determine a presence of a remote alert space along a projected path of the vehicle; and
  responsive to the determination of the presence of a remote alert space, control operation of the secondary horn system to transmit a sound into the alert space when the vehicle reaches a location that is a predetermined distance from the alert space.

* * * * *